(12) United States Patent
Park

(10) Patent No.: US 7,324,456 B2
(45) Date of Patent: Jan. 29, 2008

(54) APPARATUS AND METHOD FOR TESTING AN XDSL TRANSCEIVER UNIT-CENTRAL OFFICE

(75) Inventor: Yong-Jin Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 891 days.

(21) Appl. No.: 10/767,284

(22) Filed: Jan. 30, 2004

(65) Prior Publication Data

US 2004/0184410 A1  Sep. 23, 2004

(30) Foreign Application Priority Data

Feb. 5, 2003  (KR) ...................... 10-2003-0007286

(51) Int. Cl.
*H04L 12/26* (2006.01)
(52) U.S. Cl. ...................... 370/248; 370/493
(58) Field of Classification Search ............ 370/248, 370/252, 493, 494, 495
See application file for complete search history.

(56) References Cited

U.S. PATENT DOCUMENTS

| | | | |
|---|---|---|---|
| 5,005,197 A | 4/1991 | Parsons et al. |
| 5,111,497 A | 5/1992 | Bliven et al. |
| 5,784,558 A | 7/1998 | Emerson et al. |
| 5,883,883 A | 3/1999 | Baker et al. |
| 5,889,470 A | 3/1999 | Kaycee et al. |
| 6,192,109 B1 | 2/2001 | Amrany et al. |
| 6,208,637 B1 | 3/2001 | Eames |
| 6,292,559 B1 | 9/2001 | Gaikwad et al. |
| 6,310,909 B1 | 10/2001 | Jones |
| 6,363,079 B1 | 3/2002 | Barzegar et al. |
| 6,404,861 B1 | 6/2002 | Cohen et al. |
| 6,477,595 B1 | 11/2002 | Cohen et al. |
| 6,496,566 B1 | 12/2002 | Posthuma |
| 6,516,053 B1 | 2/2003 | Ryan et al. |
| 6,520,744 B1 | 2/2003 | Verbin et al. |
| 6,532,216 B1 | 3/2003 | Tennyson |
| 6,532,277 B2 | 3/2003 | Ulanskas et al. |
| 6,539,081 B2 | 3/2003 | Zakrzewski et al. |
| 6,574,308 B1 | 6/2003 | Macdonald et al. |
| 6,580,727 B1 | 6/2003 | Yim et al. |

(Continued)

*Primary Examiner*—Melvin Marcelo
(74) *Attorney, Agent, or Firm*—Robert E. Bushnell, Esq.

(57) ABSTRACT

A tester and related method test an xDSL transceiver unit-central office so as to measure performance of a transceiver unit by automatically converting many output ports by connecting a multiplexer to the xDSL transceiver unit. A transceiver unit-central office tester comprises: a multiplexer for connecting all ports of a modem installed in a transceiver unit-central office, and for setting a link with a subscriber transceiver unit by selecting one of the ports of the modem according to a link setup control signal; a line simulator for supplying types of lines designated according to a test environment setup control signal and line states in accordance with a set noise; and a tester for storing a set test environment from a user according to the set test environment, for transmitting the link setup control signal having a link number for test to the multiplexer, for transmitting a test environment setup control signal to the line simulator after designating the line types and setting the noise, for activating a port to be tested by transmitting the link setup control signal having the link number for test and a designated communication parameter value of the link to the transceiver unit-central office, and for receiving and storing a link state from the transceiver unit-central office.

10 Claims, 6 Drawing Sheets

U.S. PATENT DOCUMENTS

| | | |
|---|---|---|
| 6,580,752 B1 | 6/2003 | Amrany et al. |
| 6,621,831 B1 | 9/2003 | Linz |
| 6,646,994 B1 | 11/2003 | Hendrichs et al. |
| 6,763,087 B2 * | 7/2004 | Chen et al. ............ 379/1.04 |
| 2005/0163287 A1 * | 7/2005 | Ouyang et al. ............ 379/3 |
| 2006/0233228 A1 * | 10/2006 | Liang ............ 375/222 |

* cited by examiner

APPARATUS AND METHOD FOR TESTING AN XDSL TRANSCEIVER UNIT-CENTRAL OFFICE

CLAIM OF PRIORITY

This application makes reference to, incorporates the same herein, and claims all benefits accruing under 35 U.S.C. §119 from my application xDSL TRANSCEIVER UNIT-CENTRAL OFFICE PERFORMANCE, CHARACTERISTICS AND COMPATIBILITY TESTER AND METHOD THEREOF filed with the Korean Industrial Property Office on 5 Feb. 2003 and there duly assigned Serial No. 2003-7286.

BACKGROUND OF THE INVENTION

1. Technical Field

The present invention generally relates to an apparatus and method for testing an xDSL transceiver unit-central office to measure performance of a transceiver unit by automatically converting many output ports by connecting a multiplexer to the xDSL transceiver unit.

2. Related Art

An xDSL or "digital subscriber line" is a technology involving digitally speeding up a high speed subscriber network prior to perfect optical cabling by using an existing subscriber line. It uses a wideband network as a backbone network, and uses an existing coaxial line as the subscriber network occupying the most important investment position among communication networks.

Generally, a basic model for an asymmetric DSL (ADSL) network construction requires network element devices such as a subscriber terminal unit, a digital subscriber line access multiplexer (DSLAM), and a network access server (NAS).

That is, an ADSL network basically includes an ADSL terminal unit-remote (ATU-R), a subscriber ADSL interface, an ADSL terminal unit-center (ATU-C), and a central office ADSL interface. The ATU-R and the ATU-C are connected to a twisted pair cable used for existing plain old telephone service (POTS) through a subscriber splitter and a central office splitter, respectively.

In such an arrangement, the ADSL signal is demodulated as digital data through the ATU-R and processed in the subscriber computer, and digital data of the subscriber computer is modulated through the ATU-R, and then transmitted to a digital subscriber line access multiplexer (hereinafter, "DSLAM").

The DSLAM performs traffic concentration and relays of tens of or hundreds of subscribers between the subscriber terminal unit and the network access server (hereinafter, "NAS"), having a network interface for communicating with the central office splitter, the ATU-C, and a local backbone network (for instance, ATM network).

Furthermore, the central office splitter separates the signals transmitted through the twisted pair cable into an ADSL signal and a telephone signal for POTS, transmits the telephone signal for POTS to a telephone network (for instance, PSTN), and transmits the ADSL signal to the local backbone network through the ATU-C and the network interface corresponding to the number of subscribers as central office ADSL interfaces.

The NAS performs traffic processing in accordance with subscriber access, authentication, and data transceiving, connects the DSLAM to the Internet, and communicates between the local backbone network and a router. In addition, many DSLAMs installed in a corresponding local area are connected to the NAS.

Measurement of state, transmission rate and performance on DSLAM apparatus is performed repeatedly by port.

In another words, first, a line simulator is installed between an ATU-C and customer-provided equipment or CPE (at this time, a user optionally selects ports to be measured among many ports, and manually connects them), and a tester is connected to the ATU-C, the line simulator, and the CPE.

After that, the tester is operated to change line states of the line simulator, and a test signal is generated by controlling the ATU-C or the CPE in order to obtain measured data in accordance with each line state. Then, measurement data are received in accordance with the generated test signal from the ATU-C or the CPE.

At this point, when completing a test for one port, a test is conducted in accordance with the same method as described above by manually converting wiring to a next port.

However, in the case described above, since the wire has to be manually converted in order to conduct a test for the next port after completing the test for a previous port, this process requires considerable time if there are a lot of subscriber ports to be tested and a lot of simulation lines.

Also, if there are many DSLAM apparatuses to be measured, tests for abnormality, transfer rate and performance of the DSLAM apparatuses take a great deal of time in proportion to the number of apparatuses.

Moreover, since the tests for abnormality, transfer rate and performance of the DSLAM apparatuses are performed manually, it is difficult to conduct the test at night in order to reduce the testing period.

Furthermore, when the tests for abnormality, transfer rate and performance of the DSLAM apparatuses are performed, the tests statistics are compiled subjectively. Since the tester of the DSLAM apparatus is provided to test equipment developed by the equipment developer himself or herself, it is difficult to apply the tester to other equipment developed by another developer.

SUMMARY OF THE INVENTION

It is, therefore, an object of the present invention to provide a tester and method for testing an xDSL transceiver unit-central office so as to measure transmission rates or performance by automatically converting many output ports by connecting a multiplexer to a transceiver unit-central office of an xDSL.

Another object of the present invention to provide a tester and method for testing an xDSL transceiver unit-central office having generality in order to test a transceiver unit without considering the detailed design of the tested transceiver unit by defining standardized control commands between the tested unit and the tester.

Another object of the present invention to provide a tester and method for testing an xDSL transceiver unit-central office so as to collect performance statistic data by repeated measurement.

To achieve the above objects, according to one aspect of the present invention, an xDSL transceiver unit-central office tester comprises: a multiplexer for connecting all ports of a modem installed in a transceiver unit-central office, and for setting a link with a subscriber transceiver unit by selecting one of the ports of the modem according to a link setup control signal; a line simulator for supplying types of lines designated according to a test environment setup control signal and line states in accordance with a set noise; and a tester for storing a set test environment from a user according to the set test environment, for transmitting the link setup control signal having a link number for test to the multiplexer, for transmitting a test environment setup control signal to the line simulator after designating the line types and setting the noise, for activating a port to be tested by transmitting the link setup control signal having the link number for test and a designated communication parameter value of the link to the transceiver unit-central office, and for receiving and storing a link state from the transceiver unit-central office.

In addition, the present invention provides a testing method which comprises the steps of: (a) initializing a line simulator, a multiplexer, and a transceiver unit-central office; (b) transmitting a link setup control signal, designating communication parameter values of a link as predetermined values, to the transceiver unit-central office, and making the transceiver unit-central office set the link according to the designated communication parameter values; (c) transmitting a test environment setup command, including line type information and noise environment information, to the line simulator, and making the line simulator set line types and a noise environment; (d) selecting a port that has to set a link among modem ports of the transceiver unit-central office, and making the multiplexer set the link by controlling the multiplexer; and (e) activating a port to be tested by transmitting a port activation command to the transceiver unit-central office, and storing link states by receiving the transmitted link states from the transceiver unit-central office.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
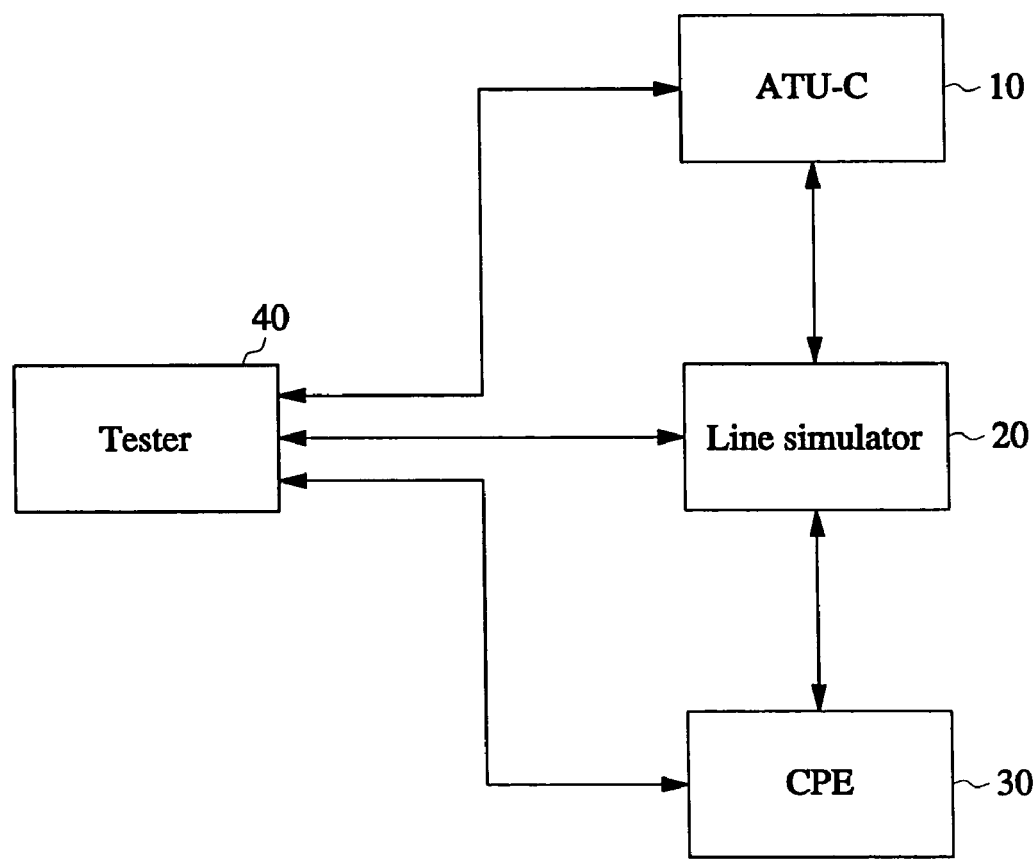
FIG. 1 is a block diagram of a tester for testing an xDSL transceiver unit-central office.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. It will also be understood that, when a layer is referred to as being "on" another layer or substrate, it can be directly on the other layer or substrate, or intervening layers may be also be present. Moreover, each embodiment described and illustrated herein includes its complementary conductivity type embodiment as well.

Hereinafter, a preferred embodiment of the present invention is described with reference to the drawings.

FIG. 1 is a block diagram of a tester for testing an xDSL transceiver unit-central office. First, a line simulator 20 is installed between an ATU-C 10 and a CPE 30 (at this time, a user optionally selects ports to be measured among many ports, and manually connects them). A tester 40 is connected to the ATU-C 10, the line simulator 20, and the CPE 30.

Subsequently, the tester 40 is operated to change line states of the line simulator 20, and a test signal is generated by controlling the ATU-C 10 or the CPE 30 in order to obtain measured data in accordance with each line state. Then, measurement data are received in accordance with the generated test signal from the ATU-C 10 or the CPE 30.

On this occasion, when completing a test for one port, a test is conducted in accordance with the same method as described above by manually converting the wiring to a next port.

However, in the case described above, since the wire must be manually converted in order to conduct a test for the next port after completing the test for a previous port, the process requires considerable time when there are a lot of subscriber ports to be tested and a lot of simulation lines.

Moreover, if there are many DSLAM apparatuses to be measured, tests for abnormality, transfer rate and performance of the DSLAM apparatuses take a large amount of time in proportion to the number of the apparatuses.

Furthermore, since the tests for abnormality, transfer rate and performance of the DSLAM apparatuses are performed manually, it is difficult to conduct the test at night in order to reduce the testing period.

Finally, when the tests for abnormality, transfer rate, and performance of the DSLAM apparatuses are performed, the test statistics are compiled subjectively. Since the tester of the DSLAM apparatus is provided to test equipment developed by the equipment developer himself or herself, it is difficult to apply the tester to other equipment developed by another developer.

Figure 2:
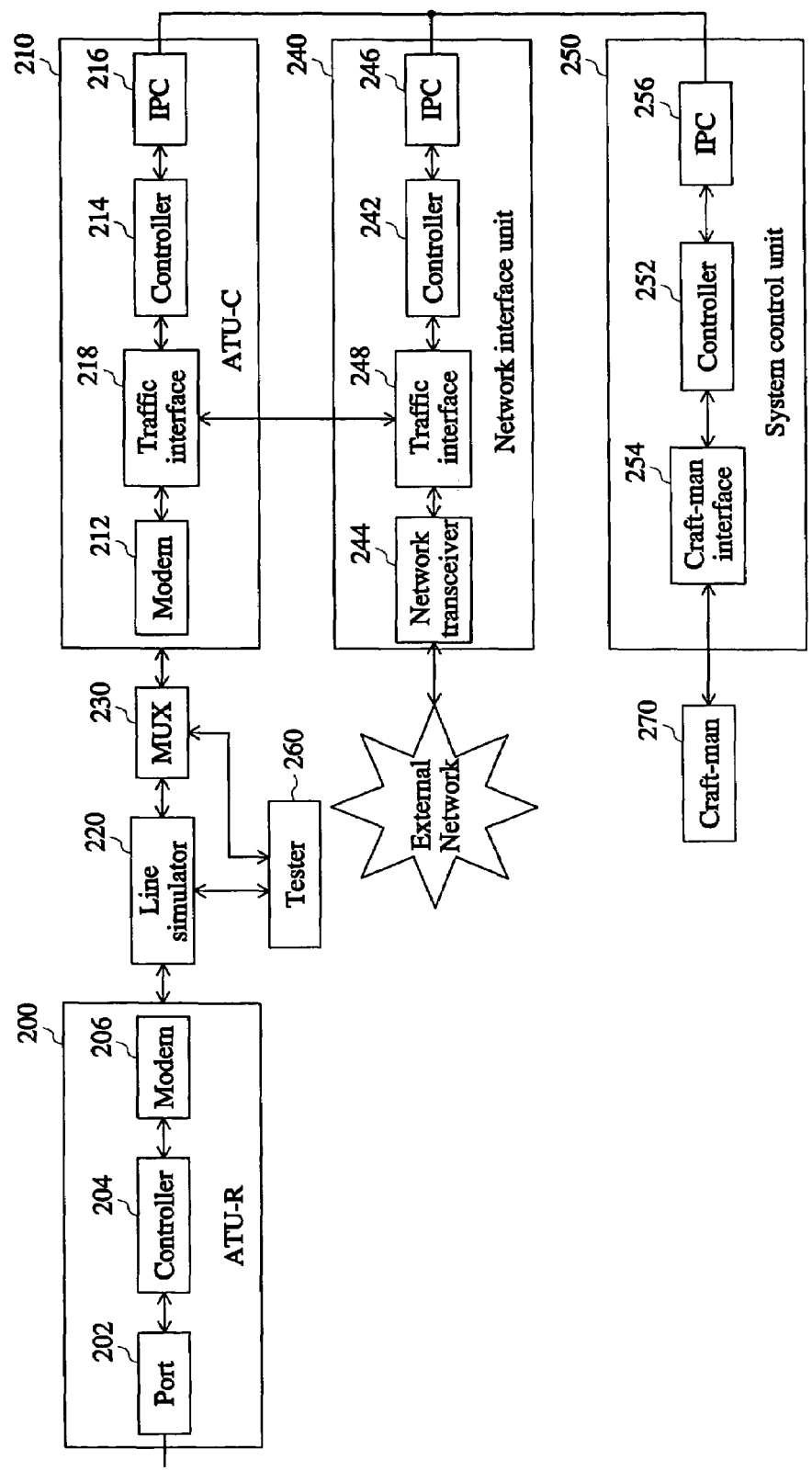
FIG. 2 is a block diagram of a tester for testing an xDSL transceiver unit-central office in accordance with an embodiment of the present invention.

FIG. 2 is a block diagram of a tester for testing an xDSL transceiver unit-central office in accordance with an embodiment of the present invention.

Referring to the drawing, the tester for testing an xDSL transceiver unit-central office in accordance with an embodiment of the present invention comprises: an asymmetric digital subscriber line transceiver unit-remote (hereinafter, ATU-R) 200 installed in a subscriber location and connected to a subscriber terminal; an asymmetric digital subscriber line transceiver unit-central office (hereinafter, ATU-C) 210 installed in a central office; a multiplexer 230 connected to the ATU-C 210, and establishing a connection with the ATU-R 200 by selecting one of many ports of a central office modem 212; a line simulator 220 located between the multiplexer 230 and the ATU-R 200, and supplying various line states; a tester 260 conducting a test for performance of the ATU-C 210 by controlling the ATU-R 200, the ATU-C 210, the line simulator 220, and the multiplexer 230, and collecting measured data according to the test; a network interface unit 240 supplying an interface function in order to enable the ATU-C 210 to communicate with an external network; and a system control unit 250.

The ATU-R 200 comprises: a PC connection port or PCI bus, USB bus connector 202 for connecting with the subscriber terminal (not shown); a controller 204 for controlling all functions of the ATU-R 200; and a modem 206 for modulating/demodulating data transceived with the ATU-C 210.

The PC connection port 202 and a subscriber PC (not shown) transmit data in a manner, such as ATM25, which is a desktop network, or via Ethernet, USB bus, and PCI bus.

The ATU-C 210 comprises: a modem 212 for modulating/demodulating data transceived with the ATU-R 200; a controller 214 for controlling all functions of the ATU-C 210; a traffic interface 218 for exchanging user traffic with the network interface unit 240; and an IPC interface 216 for transceiving control and management data with a system controller in an inter processor communication (hereinafter, IPC) way.

A link is formed between the modem 212 of the ATU-C 210 and the modem 206 of the ATU-R 200 in order to communicate in an ADSL manner. The number of receivable ATU-Rs 200 is determined in dependence on the number of modems 212 installed in the ATU-C 210. For instance, if 48 modems 212 are installed in the ATU-C 210 at the maximum, then one ATU-C 210 can be connected to 48 ATU-Rs 200 at the maximum.

The network interface unit 240 comprises: a system internal traffic interface 248 for transceiving user payload data with the ATU-C 210; a controller 242 for controlling all functions of the network interface unit 240; an IPC interface 246 for transceiving control and management data; and a network transceiver 244 for transceiving data with an external network.

The system control unit 250 comprises: an IPC interface 256 for transceiving control and management data with units, such as all of the ATU-Cs 210 and the network interface unit 240 mounted on a system in an IPC way; a controller 252 for controlling the system control unit and all functions of the system; and a craft-man interface 254 for enabling management by a manager.

The craft-man interface 254 complies with an RS-232C standard, and can be connected through a terminal emulator operated in a personal computer (PC).

The line simulator 220 sets test states of lines under control of the tester 260, the test states of the lines being determined by line types and noise.

For the line types, simple variable length lines showing that performance of the ATU-C 210 is varied according to line length are provided.

First, lines are divided by thickness. As a unit for showing line thickness, the American Wire Gauge (AWG) is used. The AWG is a number system showing thickness (diameter) of an electric wire, the number being in inverse proportion to the size of the electric wire.

In another words, the smaller the size gets, the higher the number gets. A wire of 11.68 mm in diameter is AWG#0, and a wire of 0.1270 mm is AWG#36. Thus, the number system divides gaps between the two values into 37 steps.

Electric wires used in a telephone network are mainly AWG#24, 26, and others. A cable of 24AWG is a thicker cable than 26AWG, and transmission characteristics of the 24AWG are better.

Generally, simple lines have one thickness of the two cables, and it is possible to configure various kinds of lines by using lengths, such as 500 m, 2 Km, 4.5 Km, etc.

These lines are used for a loop reach test, testing how the ATU-C 210 can set a link in a line with maximum length in kilometers, and it is difficult to set the link if the line gets longer.

For another line configuration, there are line types designated in an ADSL forum, and these line types have been defined by American National Standards Institute (ANSI), International Telecommunications Union-Telecommunication Standardization Sector (ITU-T), and others, having various kinds of length. One line is connected to various knots of 24, 26 AWG, and has a bridge tap. Standard lines designated in the ADSL forum are classified as ANSI, Canadian Standards Association (CSA), MID-CSA loop, etc.

Meanwhile, there is a common white noise and a crosstalk noise between lines, and noises corresponding to the standard lines described above are defined accordingly. Noise exerts an important influence on communication quality.

The crosstalk noise is composed of near end x-talk (NEXT), far end x-talk (FEXT), etc. The crosstalk noise models crosstalk generated between each pair of telephone lines when the telephone lines (tip and ring become one pair) are installed at home from a central office in a bundle, not one line by one line.

There are various kinds of other signals for generating crosstalk, such as xDLS itself (in case another house uses ADSL), ISDN, SHDSL, SDSL, etc.

A test related to the present invention uses a standard noise defined according to the standard lines described above. The line simulator 220 uses DSL400 series of Spirent.

The multiplexer 230 makes all ports of the modem 212 installed in the ATU-C 210 input terminals, and sets a link with the ATU-R 200 by selecting one of the input ports of the modem 212 under control of the tester 260.

The tester 260 sets a link to be tested by providing a link setup command to the multiplexer 230, and activates a port to be tested by providing a link setup command to the ATU-C 210.

In addition, the tester 260 receives a state of a current link from the ATU-C 210.

Hereinafter, a preferred embodiment of the present invention will be described in detail with reference to FIG. 2.

First, the tester 260 initializes the ATU-C 210, the line simulator 220, and the multiplexer 230. Then, the tester 260 sets a line type, and transmits a test environment setup command, including standard line numbers such as ANSI#, CSA#, MID-CSA#, to the line simulator 220 in order to set a noise environment.

The line simulator 220 then sets the test environment according to the standard line numbers received from the tester 260, and the noise environment is set by a standard noise designated according to standard lines.

In the meantime, the tester 260 can transmit thickness and length information to the simulator 220 so as to set a variable line environment without transmitting the standard line numbers, and at this point, it is necessary to inform the line simulator 220 of noise amounts for setting the noise environment.

In addition, the tester 260 transmits a link setup command to the multiplexer 230 to set a link to be tested. The link setup command includes a loop number to be connected to a singular side out of many tips and rings.

For instance, the link setup command transmitted to the multiplexer 230 from the tester 260 can be "SET loop #". Also, the tester 260 transmits a communication parameter setup command to the controller 214 of the ATU-C 210 so as to set ADSL communication parameters.

The set communication parameters include target SNR margins, target transmission rates, target power spectral density (P SD), target interleave depth, and target transmission latency of each port.

The SNR margins show link stability, and this value commonly uses 6 dB. The bigger the value is, the better the stability is. When this value gets reduced, the transmission rates get higher, but stability deteriorates, thereby increasing the possibility of error generation during transmission.

The transmission rates are parameters showing how many bits are transmitted per second. As for currently supplied transmission rates, upward rates are less than 1 Mbps and downward rates are less than 8 Mbps.

The interleave depth is a parameter showing the number of interleaving. When a value is '0', it means interleave is disabled. In a test process, 1 to 16 interleave depths are used.

The PSD is a parameter showing strength of power used for transmission, using −40 dBm upward and downward, respectively.

On the other hand, for instance, "SET-SNR-UP#port required_SNR" can be used as a minimum upward SNR value setup command, and "SET-SNR-DOWN#port required_SNR" can be used as a minimum downward SNR value setup command.

Also, as an example, "SET-RATE-UP #port max_up-rate" can be used as an upward target transmission rate setup command, and "SET-RATE-DOWN#port max_down_rate" can be used as a downward target transmission rate setup command.

In addition, "SET-INTERLEAVE-UP #port" can be used as an upward link interleave depth setup command, and "SET-INTERLEAVE-DOWN#port" can be used as a downward link interleave depth setup command.

For example, "SET-PSD-UP#port max_up_PSD" can be used as a maximum power density setup command of an upward signal, and "SET-PSD-DOWN #port max_down_PSD" can be used as a maximum power density setup command of a downward signal.

In addition, "SET-LATENCY-UP #port latency" is used as an upward transmission latency setup command, and "SET-LATENCY-DOWN #port latency" can be used as a downward transmission latency setup command.

Next, when the communication parameter setup is completed, the tester 260 transmits a link setup command to the ATU-C 210 in order to set a link for a corresponding port, and makes the ATU-C set the link. The expression "ACT #port" can be used as a command, and the link for a port corresponding to # is set.

The link setup starts when the ATU-R 200 transmits a connection setup request signal to the ATU-C 210, and the ATU-C 210 transmits a connection setup approval signal to the ATU-R 200.

The ATU-C 210 and the ATU-R 200 perform a handshake process of transceiving signals, such as an information request, information transmission, and receiving confirmation for reciprocal communication. They then complete the link setup.

When the link setup is completed, the controller 214 of the ATU-C 210 reports the link setup completion to the tester 260, and the tester 260 upon receiving the link setup completion transmits a link state report command. For instance, "GET-Link-STATUS #port" can be used as the link state report command.

Then, the ATU-C 210 receiving the link state report command reports the link state to the tester 260. At this time, the state data are reported as follows. Current rate-up, current rate-down, maximum rate-up, maximum rate-down, SNR margin-up of current uplink, SNR margin-down of current downlink, interleave depth-up of current uplink, interleave depth-down of current downlink, PSD up of upward signal, PSD down of downward signal, RS-code word size up of DMT, RS-code word size down for DMT, attenuation-up of upward line, attenuation-down of downward line, latency-up of upward line, and latency-down of downward line are reported.

The tester 260 receiving the state data from the controller 214 of the ATU-C 210 stores the state data in a memory, displays it to a user through a monitor, or prints measurement data through a printer.

Figure 3:
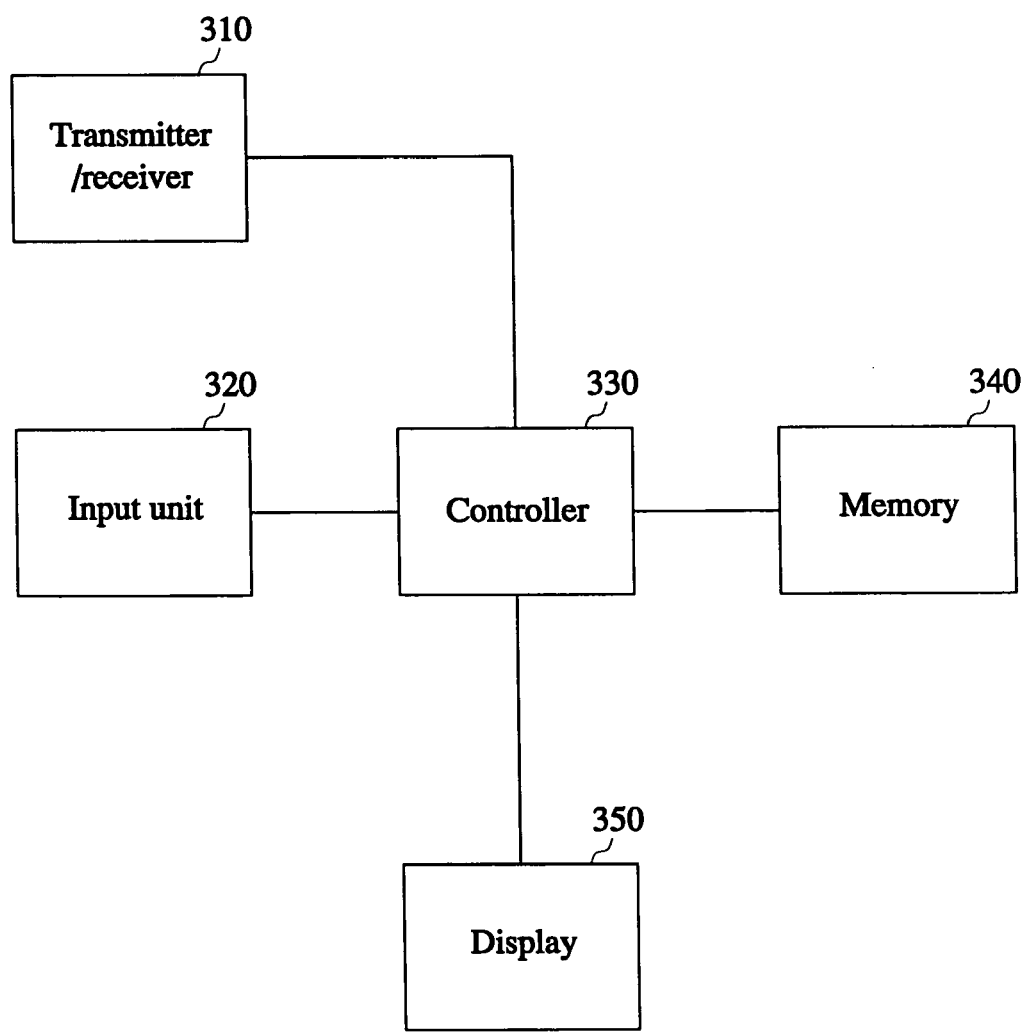
FIG. 3 is a detailed block diagram of the tester of FIG. 2.

FIG. 3 is a detailed block diagram of the tester of FIG. 2, having a transceiver 310, an input unit 320, a controller 330, a memory 340, and a display 350.

Figure 4:
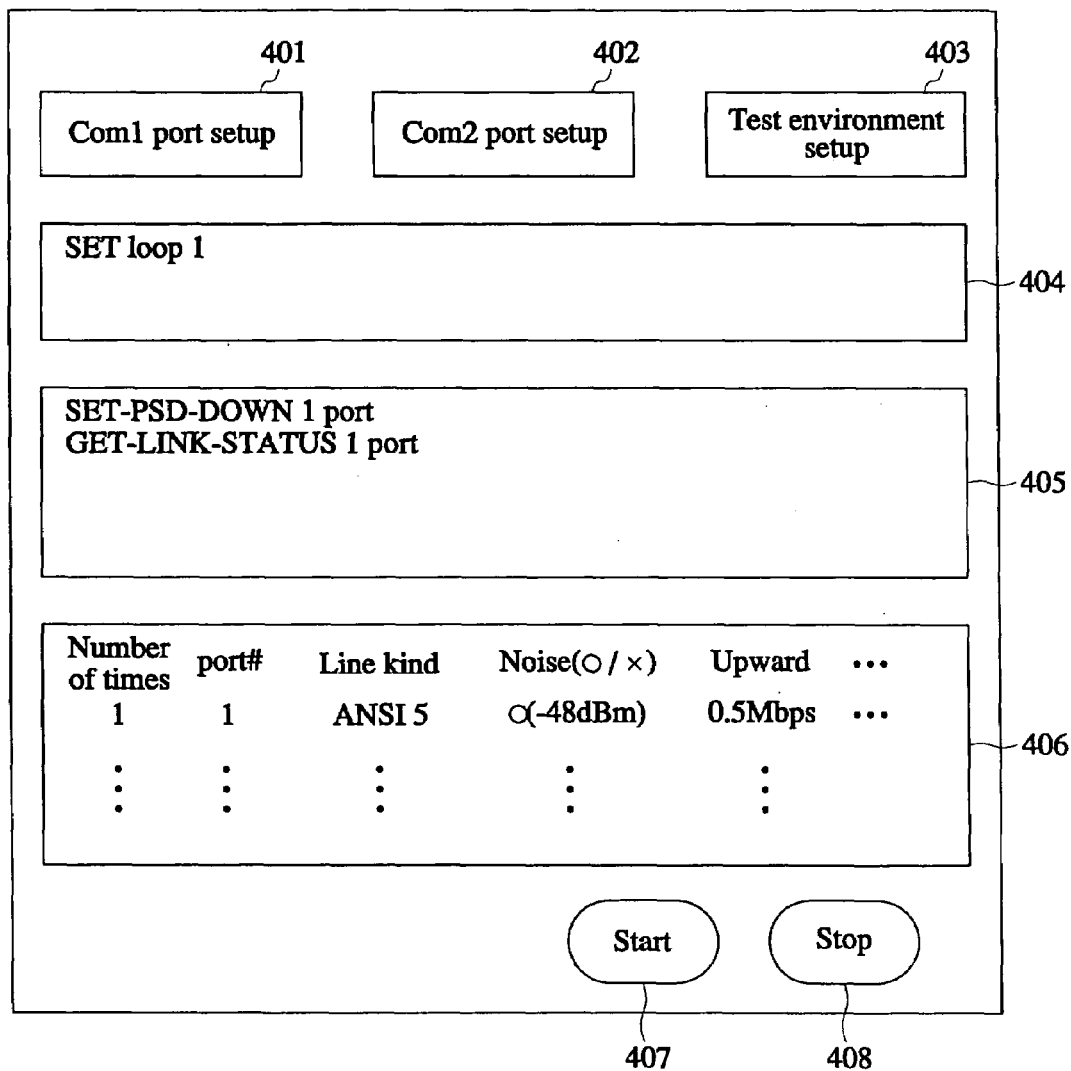
FIG. 4 and FIG. 5 are diagrams of screens used in the present invention.

First, the controller 330 supplies a monitoring screen to the display 350 as shown in FIG. 4.

On the monitoring screen shown in FIG. 4, a Com1 port setup button 401 is used to set, 11 open, or close a Com1 port. With the Com1 setup button 401, a user can set the Com1 port connected to a multiplexer, and enable communication between the controller 330 and the multiplexer by opening the set Com1 port.

As for Com1 port setup, when the user locates a cursor on the button, the controller 330 sensing it supplies a lower menu having Com1 port setup, Com1 port open, and Com1 port close functions to the user.

When the user selects the Com1 port setup function of the lower menu, a pop-up window capable of setting the Com1 port is supplied to the user, the user inputs data necessary for setting the Com1 port, and then the port is set.

When the port setup is completed, the user selects the Com1 port open function of the lower menu to enable communication by opening the set Com1 port. Also, the user sets a Com2 port connected to an ATU-C by using a Com2 port setup button 402 and opens the set Com2 port, enabling communication between the controller 330 and the ATU-C. On the other hand, a line simulator and a tester perform communication by using a general-purpose interface bus (GPIB), and the GPIB is a kind of external bus for transmitting information by connecting a computer with peripherals.

Generally, the GPIB is called a "universal interface bus" in an abbreviated form. Originally, Hewlett-Packard Co. (HP) developed it, and called it "HPIB", named after HP. However, the Institute of Electrical and Electronics Engineers (IEEE) of the United States standardized it to IEEE 488 in 1978, and then the International Electrotechnical Commission (IEC) standardized it to IEC 625 based on the IEEE 488.

Next, a test environment setup button 403 in FIG. 4 is supplied to the user to set line types, noise environment, a port range to be tested, and the test frequency. Thus, the user can set the line types, noise, the port range to be tested, and the test frequency by using the test environment setup button 403.

Such a test environment setup process is as follows. First, when the user locates a cursor on the test environment setup button 403, the controller 330 sensing the cursor location supplies line types, a noise setup lower menu, a lower menu for selecting a port range to be tested, and a lower menu for selecting the test frequency.

Figure 5:
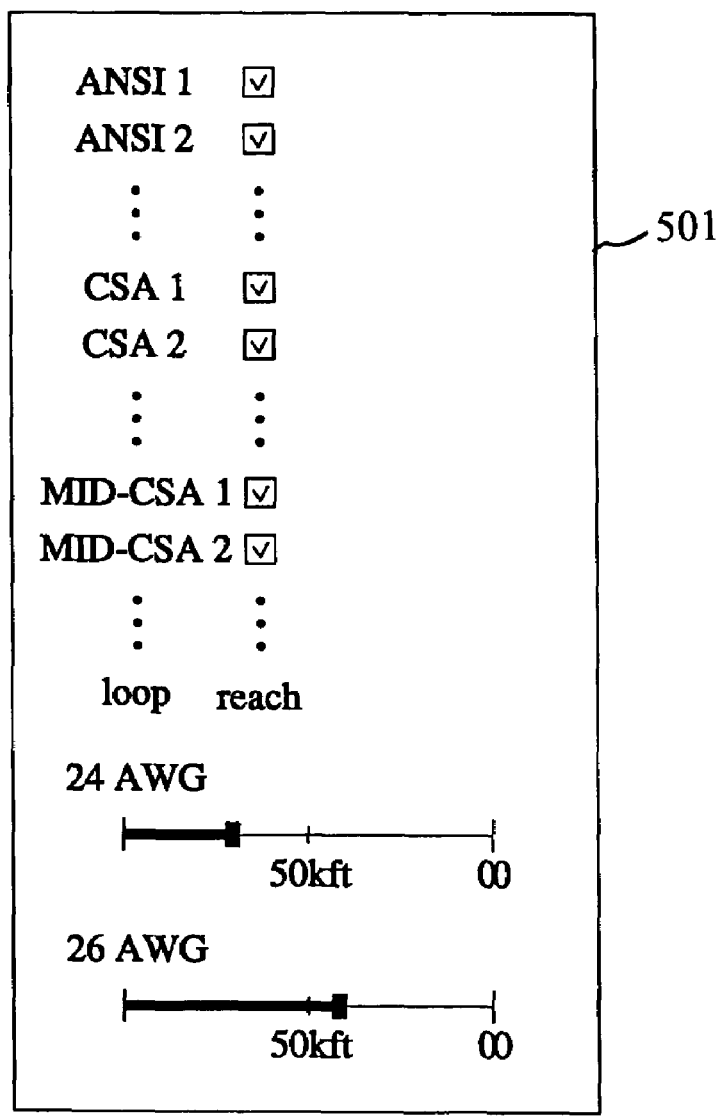

When the user selects the line types and the noise setup lower menu, a test environment setup window 501 as shown in FIG. 5 is supplied. On the supplied test environment setup window, a standard ANSI loop number and a selection box, a standard CSA loop number and a selection box, a standard MID-CSA loop number and a selection box, and 24AWG and 26AWG selection bars for loop reach are provided.

The user selects a wanted line type by checking or drawing a selection box or a selection bar of a loop to be tested, and a standard noise is determined accordingly.

In addition, the user can select a port range to be tested (for instance, 1~15, 2-34, etc.) by selecting the lower menu for selecting the port range to be tested. This lower menu is similar to that shown in FIG. 5, but contains data specific to selection of a port range to be tested.

Also, the user can determine the test frequency by using the lower menu for selecting the number of testing times. This lower menu is similar to that shown in FIG. 5, but contains data specific to selection of number or frequency of testing times.

When the test environment setup as described above is completed, the controller 330 stores the set test environment in the memory 340.

When the user presses a test start button 407 to conduct a test, the controller 330 gives a link setup command to the multiplexer through the transceiver 310 by recognizing a start key signal, and sets line types and a noise environment by transmitting a loop type to be tested to the line simulator.

Next, the controller 330 sets a link by transmitting a link setup command to an ATU-C controller.

Moreover, when a link setup completion command is received from the ATU-C controller, the controller transmits a link state report command to receive a link state.

The controller 330 stores the reported link state in the memory 340, and makes the user confirm the reported link state through a result screen 406, as shown in FIG. 4.

At this point, on the supplied result screen 406, the number of times, a port number, a line kind, a noise value, and situation data are supplied in order.

In the meantime, the controller 330 monitors states of the multiplexer and an ATU-C, supplies the monitored multiplexer state to a multiplexer state screen 404, and supplies the monitored ATU-C state to an ATU-C state screen 405.

Figure 6:
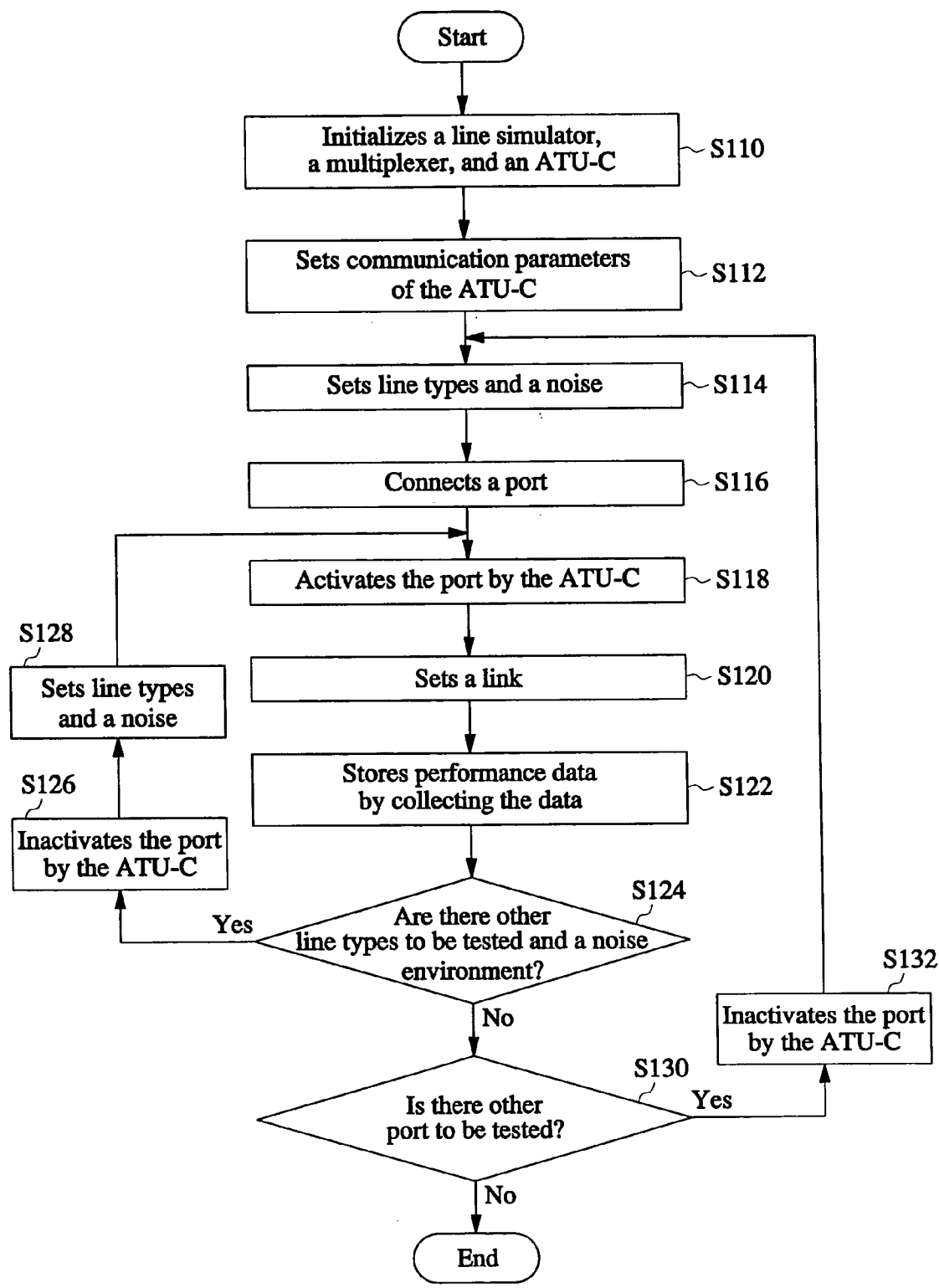
FIG. 6 is a flow chart of a method of testing an xDSL transceiver unit-central office in accordance with an embodiment of the present invention.

FIG. 6 is a flow chart of a method of testing an xDSL transceiver unit-central office in accordance with an embodiment of the present invention.

Referring to the drawing, the method for testing the xDSL transceiver unit-central office in accordance with an embodiment of the present invention comprises the steps of: initializing a line simulator, a multiplexer, and an ATU-C (S110); making the ATU-C set communication parameters by transmitting a link setup control signal, including communication parameter information such as target SNR margin, target transmission rate, target Power spectral density (PSD), target interleave depth, and target transmission latency, to the ATU-C (S112); transmitting a test environment setup command, including line type information and noise environment information, to the line simulator, and making the line simulator set line types and a noise environment (S114); selecting a port which has to set a link with an ATU-R among many modem ports of the ATU-C, controlling the multiplexer in order to set a connection with a modem of the ATU-R, and connecting a modem of the ATU-C to be tested with the modem of the ATU-R (S116); activating a port to be tested by transmitting a port activation command to a controller of the ATU-C (S118), and setting a connection or link between the ATU-C and the ATU-R (S120); transmitting a current state report command to the ATU-C after receiving a connection setup completion signal from the ATU-C, receiving a current state from the ATU-C, and collecting performance data (S122); deciding whether other line types to be tested and a noise environment exist (S124), and inactivating the port by the ATU-C if the other line types to be tested and the noise environment exist (S126); transmitting a test environment setup command, including line type information and noise environment information, to the line simulator so as to set line types and a noise environment (S128), and repeating from step S118; if other line types to be tested and a noise environment do not exist in step S124, deciding whether another port to be tested exists (S130); and inactivating a port of the ATU-C if another port to be tested exists, and repeating from step S114; and otherwise, if no other port to be tested exists in step S130, ending the process.

On the other hand, even though a test for the ATU-C has been conducted just one time, it is possible to repeat the test many times.

According to the present invention as described above, transmission rates or performance can be measured by automatically converting many output ports by connecting a multiplexer to an xDSL transceiver unit.

Also, according to the present invention, a transceiver unit can be tested without considering the detailed design of the transceiver unit to be tested, and performance statistic data can be collected by repeated measurement.

It is to be understood that changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

Thus, although preferred embodiments of the present invention have been described, it will be understood by those skilled in the art that the present invention should not be limited to the described preferred embodiments. Rather, various changes and modifications can be made within the spirit and scope of the present invention, as defined by the following claims.

What is claimed is:

1. An apparatus for testing an xDSL transceiver unit-central office, comprising:
    a multiplexer for connecting all ports of a modem installed in a transceiver unit-central office, and for setting a link with a subscriber transceiver unit by selecting one of the ports of the modem according to a link setup control signal;
    a line simulator for supplying line types designated according to a test environment setup control signal and line states in accordance with a set noise; and
    a tester for storing a set test environment from a user, for transmitting the link setup control signal having a link number for test to the multiplexer, for transmitting the test environment setup control signal to the line simulator after designating line types and setting noise, for activating a port to be tested by transmitting the link setup control signal having the link number for test and a designated communication parameter value of the link to the transceiver unit-central office, and for receiving and storing link states from the transceiver unit-central office.

2. The apparatus according to claim 1, wherein the line types supplied by the line simulator include at least one of line types designated in an xDSL form and simple variable length line types, and the noise set by the line simulator is designated in an xDSL form when the line types are designated in the xDSL form.

3. The apparatus according to claim 2, wherein a diameter of simple variable length lines supplied by the line simulator is one of American Wire Gauge (AWG) #24 and AWG #26.

4. The apparatus according to claim 1, wherein when the tester transmits the link setup control signal to the transceiver unit-central office, the communication parameters included in the link setup control signal transmitted by the tester to the transceiver unit-central office include at least one of SNR margins, target transmission rates, target power spectral density (PSD), target interleave depth, and target transmission latency.

5. The apparatus according to claim 1, wherein the link states transmitted from the transceiver unit-central office include at least one of current rate-up, current rate-down, maximum rate-up, maximum rate-down, SNR margin-up of current uplink, SNR margin-down of current downlink, interleave depth-up of current uplink, interleave depth-down of current downlink, PSD up of upward signal, PSD down of downward signal, RS-code word size up of DMT, RS-code word size down for DMT, attenuation-up of upward line, attenuation-down of downward line, latency-up of upward line, and latency-down of downward line.

6. The apparatus according to claim 1, wherein the tester comprises:
an input unit generating an input signal in accordance with a user operation;
a transceiver for supplying communication with the multiplexer, the line simulator and the transceiver unit-central office;
a memory for storing a set test environment, and for storing the link states transmitted from the transceiver unit-central office;
a display for supplying a test environment setup screen and a monitoring screen to a user; and
a controller for receiving the set test environment from the user by supplying the test environment setup screen through the display, for storing the set test environment in the memory, for transmitting the link setup control signal having the link number for test to the multiplexer, for transmitting the test environment setup control signal to the line simulator after designating line types and setting a noise, for activating the port to be tested by transmitting the link setup control signal having the link number for test and the designated communication parameter value of the link to the transceiver unit-central office, and for receiving and storing the link states from the transceiver unit-central office.

7. The apparatus according to claim 6, wherein the test environment setup screen supplied by the controller through the display includes at least one of a line type setup window, a noise environment setup window, a port range setup window to be tested, and a frequency setup window.

8. A method of testing an xDSL transceiver unit-central office, comprising the steps of:
(a) initializing a line simulator, a multiplexer, and a transceiver unit-central office;
(b) transmitting a link setup control signal designating communication parameter values of a link as predetermined values to the transceiver unit-central office, and making the transceiver unit-central office set the link according to the designated communication parameter values;
(c) transmitting a test environment setup command including line type information and noise environment information to the line simulator, and making the line simulator set line types and a noise environment;
(d) selecting a port among a plurality of modem ports of the transceiver unit-central office, and making the multiplexer set a link by controlling the multiplexer; and
(e) activating a port to be tested by transmitting a port activation command to the transceiver unit-central office, and storing link states transmitted from the transceiver unit-central office.

9. The method of claim 8, further comprising the steps of;
(f) deciding whether other line types to be tested and a noise environment exist;
(g) performing process steps including step (c) repeatedly when the other line types and the noise environment exist;
(h) deciding whether another port to be tested exists when the other line types to be tested and the noise environment do not exist; and
(i) inactivating the transceiver unit-central office when said another port to be tested exists, and performing process steps including step (d).

10. The method of claim 8, wherein the designated communication parameter values include target SNR margins, target transmission rates, target power spectral density (PSD), target interleave depth, and target transmission latency.

* * * * *